and Title Page

United States Patent [19]
Gritter

[11] Patent Number: 4,958,269
[45] Date of Patent: Sep. 18, 1990

[54] CURRENT CONTROL FOR MICROPROCESSOR MOTOR DRIVE

[75] Inventor: David Gritter, Racine, Wis.

[73] Assignee: Eaton Corporation, Cleveland, Ohio

[21] Appl. No.: 225,091

[22] Filed: Jul. 27, 1988

[51] Int. Cl.⁵ .......................... H02D 5/40; H02P 1/26
[52] U.S. Cl. .................................... 364/153; 318/801; 318/806; 318/811
[58] Field of Search ............... 318/811, 139, 801, 806, 318/798, 778; 364/153

[56] References Cited

U.S. PATENT DOCUMENTS

| | | | |
|---|---|---|---|
| 4,371,824 | 2/1983 | Gritter | 318/722 |
| 4,491,768 | 1/1985 | Slicker | 318/139 |
| 4,602,201 | 7/1986 | Edwards | 318/798 |
| 4,719,398 | 1/1988 | Paice | 318/798 |

Primary Examiner—Jerry Smith
Assistant Examiner—Jim Trammell
Attorney, Agent, or Firm—M. L. Union

[57] ABSTRACT

A motor control for controlling current in an induction motor. A microcomputer generates three inputs to control an inverter circuit that energizes the three phase windings of the motor. A speed control modulates the three inputs to adjust motor speed and voltage. A current sensing circuit also modulates the three inputs to reduce motor current using a technique that over rides the speed control. By monitoring the current sensing circuit the microcomputer adjusts the speed control to force motor current to a level near a set threshold value.

14 Claims, 3 Drawing Sheets

CURRENT CONTROL FOR MICROPROCESSOR MOTOR DRIVE

FIELD OF THE INVENTION

The present invention relates to a motor control having a current control circuit that is integrated with a programmable motor speed control.

DISCLOSURE OF THE INVENTION

The present invention relates to a motor control having circuitry for monitoring currents in a bus that energizes a motor. The motor control adjusts the frequency and voltage of energization signals applied to the motor until the sensed current falls within a predetermined range. The current control of the invention provides more reliable operation under transient load conditions and is particularly suited for microprocessor pulse width modulation control of the motor windings of an induction motor.

A motor control constructed in accordance with one embodiment of the invention energizes the motor through an inverter circuit having a plurality of switches that control the polarity of bus energization of the motor windings. A three phase inverter having pairs of switching transistors for each phase can be used with a three phase induction motor.

A control unit preferably includes a programmable microprocessor for generating a pulse width modulation output that can be changed by reprogramming the microprocessor. In an induction motor application wherein three windings are activated or energized in a phased relation, the microprocessor generates three digital output signals pulse width modulated to approximate sine waves 120° out of phase with respect to each other. At any given time, two of the three digital outputs from the control have the same state, i.e., they are either high or low. The third output is of the opposite state.

In addition to the three pulse width modulated signals, the microprocessor generates an output that reduces the motor voltage and frequency to obtain a desired operating speed. This is accomplished while maintaining a proper motor flux or volts-seconds per half cycle. This modulation signal is generated by the microprocessor and includes a pulse train of a well defined frequency and duty cycle. The duty cycle or percent of time the pulse train is "high" dictates the effect this modulation signal has on the motor drive.

A logic circuit interposed between the inverter and the microprocessor control accepts as inputs the three pulse width modulated control signals as well as the modulation signal for controlling motor frequency and voltage. When the modulation signal is of a particular state (in a preferred embodiment a "high" state alters the pulse width modulation scheme of the three microprocessor outputs) the logic causes the motor winding control outputs on all three signal lines to be of the same polarity for the time period the modulation signal is "high" At the same time the three sinusoidally modulated control signals are "frozen" in time, the phase of the sinusoidally modulated signals is prevented from advancing, causing a simultaneous reduction in both voltage and frequency. The resultant reduction in motor speed will reduce the power demand on the motor, thus keeping D.C. bus current below the reference level and within the range which the power switches are able to commutate.

A current limiting circuit monitors bus current which is proportional to the current flowing through the motor windings and generates a second modulation signal based upon the monitored bus current. A comparator circuit receives a reference signal generated by the microprocessor and compares that reference signal to a signal indicating bus current. When the bus current exceeds the reference signal, an output from the current limit circuit is applied to the logic circuit to impose a control similar to the modulation scheme imposed by the microprocessor speed control. Again, the three sinusoidally modulated signals are kept from advancing in phase and the motor voltage is forced to zero.

One specific feature of the invention is the signal shaping of the overcurrent modulation signal. A shunt resistor is coupled to the inverter D.C. bus and generates an output signal which is amplified by a differential amplifier and coupled as an input to the comparator. As the motor rotor rotates in response to motor winding energization, a series of sharp spikes is produced at the output of the differential amplifier. These spikes may, if the current is excessive, exceed the threshold for only short intervals which may be so short they are ineffective in reducing motor speed. To lengthen the modulation signal duration, thereby assuring motor speed reduction, a nonlinear filter is interposed between the differential amplifier output and the comparator input to produce a more smoothly varying control signal.

An additional feature of the invention is microprocessor speed control in response to current sensing. In addition to the comparator input to the logic, a latch circuit output is periodically sensed by the microprocessor and used in determining an appropriate motor frequency which will cause the motor to operate at a speed such that the bus current exceeds its limit threshold by only a small amount. In this way, the current is adjusted to a desired level and the microprocessor automatically changes the frequency output of its modulation control to achieve a desired result.

From the above it is appreciated that one object of the invention is an improved motor control having current control capabilities for use in conjunction with a pulse width modulation motor control system. This and other objects, advantages and features of the invention will become better understood from a detailed description of the invention which is described in conjunction with the accompanying drawings.

BEST MODE FOR CARRYING OUT THE INVENTION

Figure 1:
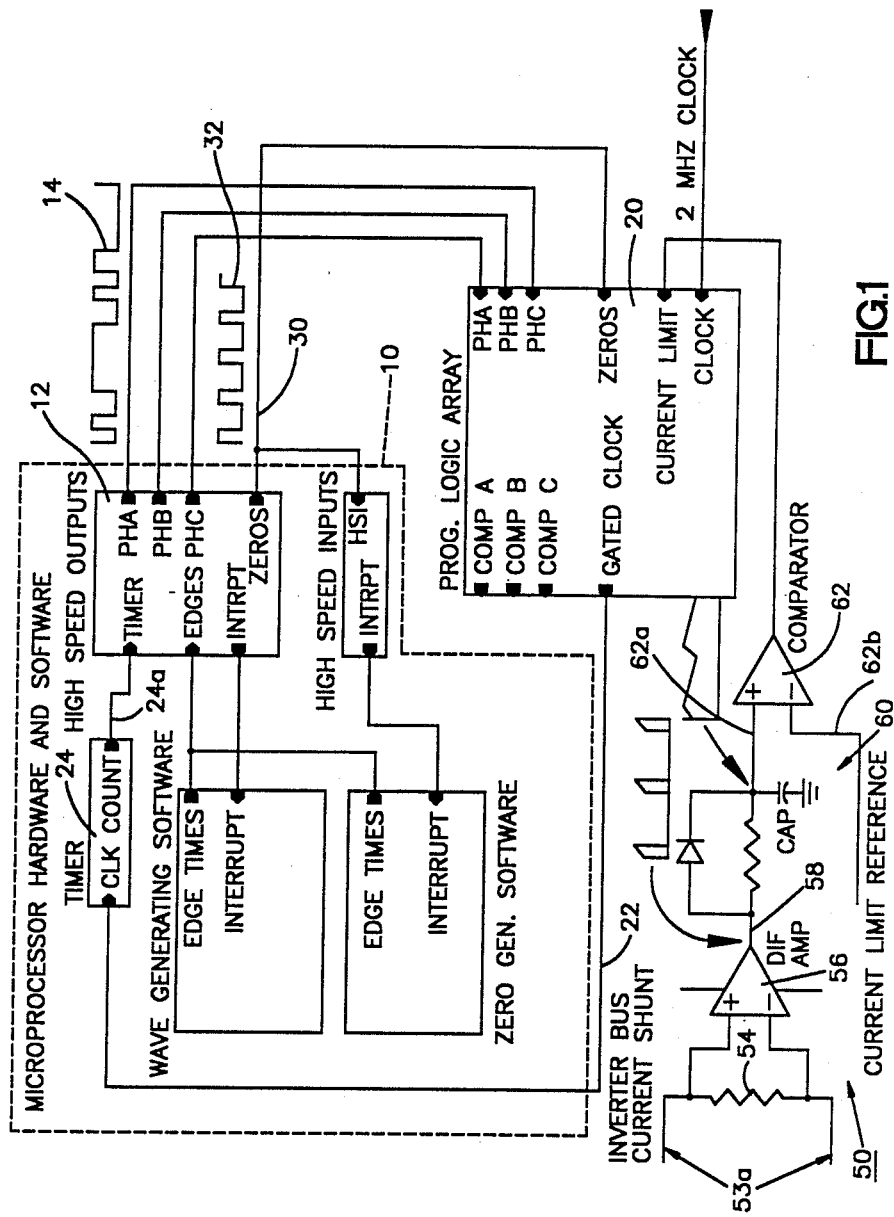
FIG. 1 is a block diagram of a motor control system constructed in accordance with the invention.

Turning now to the drawings, FIG. 1 is a schematic diagram illustrating a microcomputer system 10 that produces three digital outputs via a high speed output 12. These outputs are designated PHA, PHB and PHC to designate three phases, phase A, phase B and phase C of the microcomputer system output.

Figure 2:
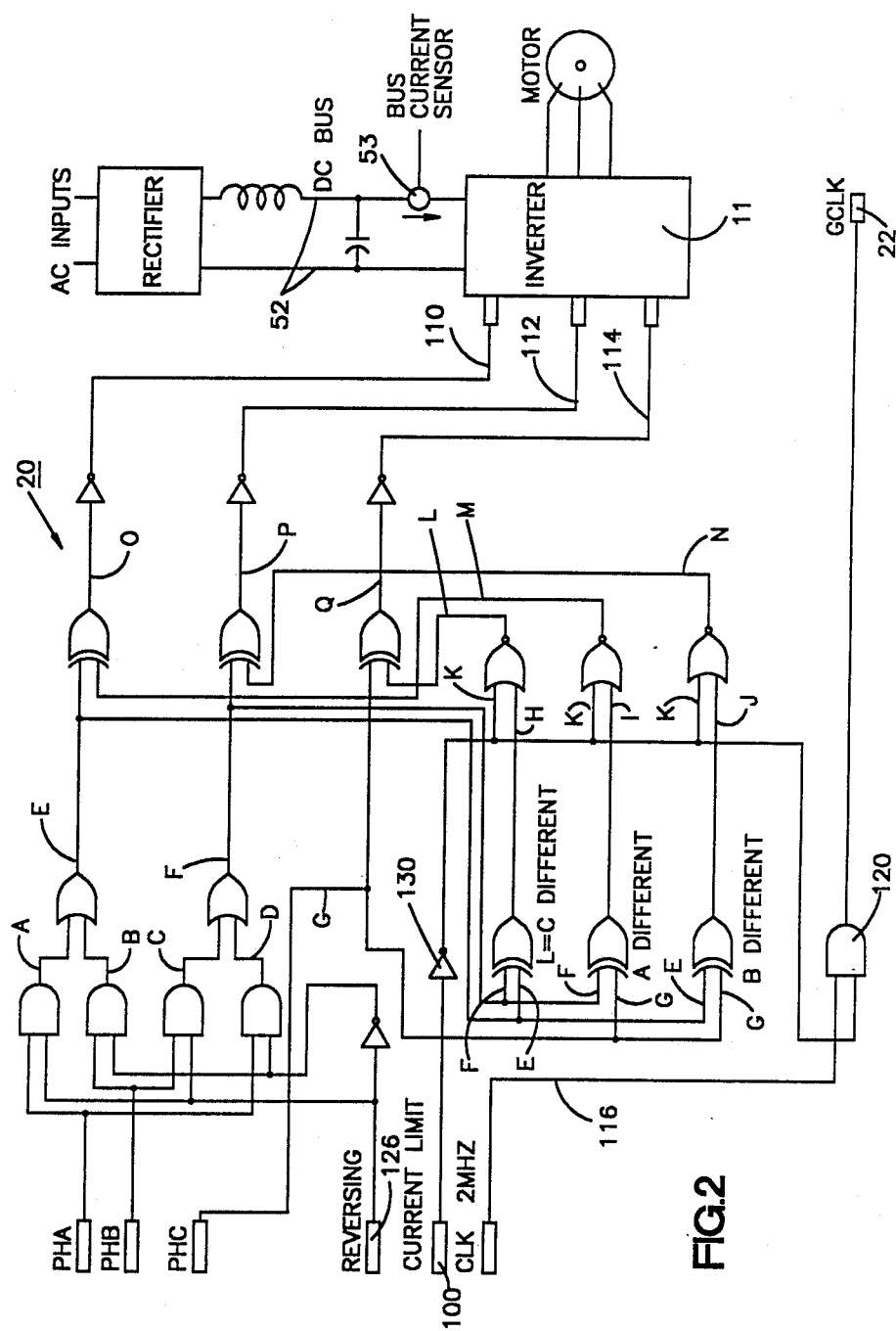
FIG. 2 is a detailed schematic of a logic circuit for modulating digital outputs from a microprocessor controller and using the modified control signals to activate an inverter; circuit.

A preferred use of the microcomputer system 10 is for controlling the energization of a three phase motor 13. The motor is energized by a direct current bus that is coupled across the motor windings by an inverter circuit 11 (FIG. 2). A prior art invertor circuit having switching transistors that are selectively rendered conductive by application of control inputs to the invertor is disclosed in U.S. Pat. No. 4,371,824 to Gritter. This patent is assigned to the assignee of the present invention and is incorporated herein by reference.

Returning to FIG. 1, a representative digital waveform 14 presented at the phase A output from the high speed output 12 is shown to include a series of on/off pulses. The microcomputer system 10 includes software for programming the duration of these pulses and in particular, in an application used in energizing a three-phase motor, the output on phase A is a repetitive waveform whose shape is programmed to approximate a sine wave having a fixed frequency. The digital outputs at the phase B and phase C interface outputs PHB, PHC are also programmed to approximate sine waves that are phase shifted in time with respect to the phase A output.

The three digital outputs from the high speed output 12 are coupled to a programmable logic array 20 having logic circuitry (FIG. 2) that modulates or adjusts the digital outputs from the microcomputer output 12. Were it not for the modulation effects of the programmable logic array 20, the three phase shifted outputs from the high speed output 12 would, in conjunction with the inverter circuit 11, drive a three phase motor at a constant frequency and maximum voltage.

The microcomputer system 10 incorporates an intel 8096 microprocessor that includes a high speed output that can be programmed to generate the phase A, phase B and phase C output signals. These signals are interrupt driven based on a time base from an external clock signal at a clock input 22. A timer 24 is clocked by the clock signal 22. A timer output 24a is coupled to the high speed output 12 which produces programmed transitions at the phase A, B and C outputs whenever the timer output 24a equals the programmed transition time. The output 12 also generates an internal interrupt after the occurrence of every three transition pulses so that once started, the high speed output co-ordinates its operation with the waveform generating software which programs the relationship between the transitions of the three phase outputs PHA, PHB and PHC.

The microprocessor system 10 also generates a so-called zero's signal at an output 30 from the high speed output 12 which is also coupled to the programmable logical array 20. The output 30 includes a series of pulses whose duty cycle is programmed into microcomputer system software. The duty cycle of the pulse train 32 seen in FIG. 1 can be adjusted and as the duty cycle increases (as the time duration of the high portion of the output increases) the motor speed and voltage applied to the motor are reduced. The zero's output 30 is derived from a hardware timer not depending on the externally generated clock signal at the input 22.

Whenever the programmable logic array 20 senses a "high" signal at the zero's output 30, it adjusts one of the three phase signal outputs, causing all three motor drive signals to have the same state for the duration of the "high" zero's output. At any given time during motor operation, two of the three outputs phase A, phase B, phase C have the same state and the third output has the opposite state. As an example, if one were to examine the status of these three phase outputs, one might find that phase A and phase B were high and phase C is low. It is the function of the programmable logic array 20 to monitor the zero's output 30 and during those intervals the zero's output is high to change the state of phase C such that all three phase outputs are high and to extend this period during the time duration of the zero's high pulse.

In addition to switching an appropriate one of the three phase signals, the logic array 20 suspends clocking of the microcomputer system 10 at the input 22 during that interval that the zero's output 30 is high. This, in essence, freezes the phase outputs in place for that duration in addition to switching one of those outputs. The effect on motor energization is therefore to freeze the drive signals applied to the inverter for the duration of the zero's input. This reduces the frequency of the motor's operation and in addition reduces the voltage applied to the motor by the energization bus.

While the high speed outputs PHA, PHB, PHC from the microcomputer system 10 are suspended due to the program logic array operation on the clock signal 22, the microcomputer's internal timer continues to generate signals that cause the pulse train at the output 30. On the next transition of the zero's output from high to low, the programmable logic array 20 reinstitutes the generation of the phase shifted outputs phase A, phase B, phase C by clocking of the microprocessor system 10 via the external clock signal 22 which is passed through the programmable logic array 20.

In summary, by programming the microcomputer system and in particular by adjusting the duty cycle of the output 12, the speed and voltage applied to the motor can be adjusted to achieve a desired mode of motor operation.

CURRENT CONTROL

Returning to FIG. 1, a current limiting circuit 50 monitors current passing through the direct current motor energization bus 52 by means of a D.C. current transformer 53 which energizes a resistor 54 by means of a LEM type sensor that provides an electrically isolated output 53a across the resistor 54. Bus current is present only during those time intervals when the bus voltage is applied to the motor terminals by appropriate switching of the inverter's power transistors. During this time period, the bus voltage is coupled across the motor windings which causes bus current to increase. As this happens, the voltage across the resistor 54 increases, which in turn creates a signal across the inputs of a differential amplifier 56 used to sense bus current. An output 58 from the differential amplifier 56 is coupled through a filtering circuit 60 to a comparator amplifier 62 which monitors the signal output by the differential amplifier.

The comparator 62 has two inputs 62a, 62b. The input 62b receives a reference signal corresponding to a control current. This signal at the input 62b is programmable and can be raised and lowered depending upon the desired motor current and subject to the peak current handling capability of the inverter. When the signal at the input 62a exceeds the reference signal, the comparator output changes state and sends this indication to the programmable logic array 20. The affect of the comparator output on the three phase signals from the microcomputer system 10 is analogous to the occurrence of a high signal on the zero's output 30. That is, the phased outputs used to drive the motor inverter circuit are suspended, one of those inputs is reversed in state, and the clock signal applied to the microcomputer system 10 on the signal line 22 is also suspended. Motor energization is frozen until the motor current falls to a value causing the comparator output to change states, returning motor energization modulation to the zero's signal 30. The filtering circuit 60 regulates the width of the current limit pulses and the switching frequency of the inverter as discussed below.

LOGIC CIRCUIT

Turning now to FIG. 2, the schematic of the programmable logic array 20 includes three inputs labeled PHA, PHB, PHC from the microcomputer system 10 on the left hand portion of the schematic. The purpose of the programmable logic array is to monitor an input 100 which goes high on receipt of either a zero's input from the microcomputer system 10 or a high current signal from the comparator 62. Upon receipt of this high signal, the programmable logic array circuitry converts one of the phase inputs to temporarily make all outputs 110, 112, 114 to the inverter 11 the same state and in addition, suspends gating of a clock input 116 signal through an and gate 120 to the microcomputer system clock input 22.

Figure 3:
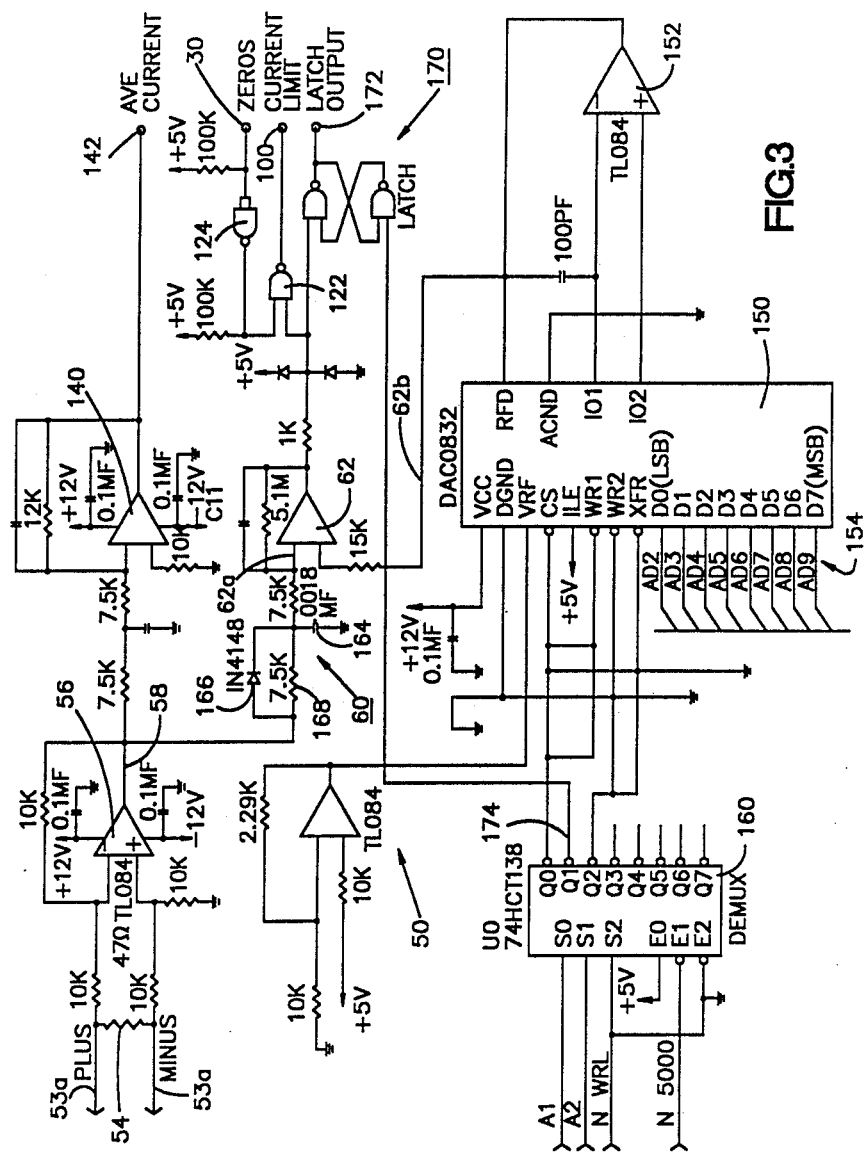
FIG. 3 is a detailed schematic of a current limit circuit for monitoring motor current and providing a second modulation signal for use with the FIG. 2 logic.

Turning briefly to FIG. 3, a more detailed schematic of the current sensing circuit 50 is seen to produce an output from the comparator 62 which is coupled to one input of an and gate 122. A second input to this hand gate 122 is generated by a zero's input from the microcomputer system 10. Specifically, this zero's input passes through an invertor logic gate 124 to the nand gate 122. Table 1 below indicates the output state of the current limit signal coupled to the FIG. 2 programmable logic array for each of the four possible conditions of the zero's input and comparator output.

TABLE 1

| Zero's | H | H | L | L |
| --- | --- | --- | --- | --- |
| Comparator | H | L | H | L |
| Current Limit | H | H | L | H |

It is seen from examining the truth table that the current limit signal goes high upon receipt of either a high signal at the zero's input or a low signal output from the comparator 62.

Returning to the programmable logic array of FIG. 2, the current limit input passes through an invertor 130 and is coupled to the gate 120. Thus, whenever the current limit signal is high, the gate 120 has one input that is low and the clock signal appearing at the second and gate input is inhibited until the current limit signal again goes low. This suspends the clocking of the high speed outputs from the microcomputer system 10 so that the phase A, phase B and phase C inputs to the FIG. 2 programmable logic array 20 remain constant so long as the current limit remains high.

The logic circuitry monitors the three phase inputs, the current limit input and an input 126 labeled "reversing". It functions to determine the "odd phase input", i.e., the phase input having a different state from the other two. The reversing input 126 determines the direction of motor rotation.

When the odd phase input is identified, it is switched to the same state as the other two for the time duration that the current limit input is high. A truth table indicating the state of various circuit junctions A-Q in the programmable logic array of FIG. 2 is summarized in Table II below.

These status conditions are for one state where PHA=PHB=high, PHC=low, REVERSING=H, and CURRENT LIMIT=HIGH.

TABLE 2

| | FIG. 2 | | | | | | | | | | | | | | | | |
| --- | --- | --- | --- | --- | --- | --- | --- | --- | --- | --- | --- | --- | --- | --- | --- | --- | --- |
| Junction | A | B | C | D | E | F | G | H | I | J | K | L | M | N | O | P | Q |
| State | H | L | H | L | H | H | L | L | H | H | L | H | L | L | H | H | H |

It is noted that the phase A and phase B are the same state while phase C is of an opposite state. Analysis of the output of the truth table indicates that the outputs 0, P and Q are of the same state so long as the current limit input is high. When the current limit input is low, the phases at the three inputs are transmitted unchanged through the programmable logic array. One skilled in the art upon examining the status of these programmable logic array junctions (A-Q) for other states can readily confirm that the programmable logic array, upon receipt of the high input at the current limit input 100 converts an odd phase input so that all three inverter inputs 110, 112, 114 are the same state.

ANALOG CIRCUIT

FIG. 3 depicts the current sensing portion of the FIG. 1 schematic in more detail. The differential amplifier 56 produces a negative going output coupled to the comparator 62 and in addition generates an output which is amplified by an amplifier 140 to generate an average current output signal 142 coupled to the microcomputer system 10.

FIG. 3 also illustrates the mechanism for presenting a reference signal to the comparator input 62b. A digital-to-analog converter circuit 150 is loaded with a reference signal by presenting a digital (8 bit) signal on the data bus 154 from the microcomputer system 10 which is latched into the digital-to-analog converter 150, converted to an analog output which is amplified by an amplifier 152 and directed to the input 62b of the comparator 62. A de-multiplexing unit 160 includes four control inputs coupled to the microcomputer system 10. These inputs cause the digital-to-analog converter 150 to latch data into the converter presented on the data bus 154 and present that data in analog form to the amplifier 152.

As noted above, interposed between the differential amplifier and the comparator is a filter circuit including a capacitor 164, diode 166 and resistor 168. Receipt of a sharp output from the differential amplifier due to a rapid increase in current through the energization bus 52 causes the capacitor to charge to a value which may exceed the threshold input from the digital-to-analog converter. But for the presence of the filter circuit 60, however, the comparator would generate only very short duration output pulses each time the bus current exceeded the threshold since the sensed current falls to zero as soon as the comparator output causes the motor voltage to become zero. To extend the pulse width and also to provide a signal more representative of actual motor current the filter circuit 60 shapes the differential comparator output. During the time when the bus current is present, the diode 166 directly charges the capacitor to reflect actual bus current. When the bus current returns to zero, the capacitor 164 discharges through the resistor 168 with a time constant roughly equal to the rate at which current decays in the motor. This produces a variable width current limit pulse responsive to the motor current rather than a series of sharp spikes whose duration bear no relation to actual motor current. The switching frequency of the inverter is limited by the hysteresis of the comparator and by delays in the inverter's response to comparator output which cause the bus current to overshoot the reference input 62b.

A latch circuit 170 (FIG. 3) is coupled to the output from the comparator 62. The microcomputer system 10 monitors a latch output 172 and resets the latch 170 by an output 174 from the de-multiplexing unit 160. In response to reading the latch output, the microcomputer system 10 adjusts the operating speed of the motor 20 by adjusting the zero's output 30 to produce an operating current near the threshold value. The latch output 172 is periodically read and if it is set the zero's output duty cycle is increased to slow the motor.

There are two reasons why it is desirable for the microprocessor to increase the duty cycle of the zero's output. First, if only the current limit comparator output is used to reduce motor frequency, it will tend to cause the motor currents to become square in shape rather than sinusoidal, simply because the current limit circuitry by its nature constrains the peak bus current to be held constant. If, on the other hand, the zero's output is used to reduce motor frequency, it will be necessary for the current limit comparator to insert additional zero's only on an infrequent basis so that it will not have sufficient opportunity to distort the motor current.

Secondly, if the comparator is required to make radical changes in motor frequency, it will tend to do so by inserting relatively long zero pulses into the waveform. During these long intervals, motor current circulates within the inverter and may build up to a level well above the current handling capability of the inverter transistors even though the bus current is regulated to below the comparator's reference level. This effect is particularly noticeable when a square shaped motor current is in the process of commutating from one phase to the next. Since excess current in a transistor will cause the drive to shut down to protect the transistor, it is not possible to obtain reliable drive operation in heavy current limit conditions without assistance in frequency reduction from the microprocessor's zero's output.

The present invention has been described in conjunction with a three-phase induction motor having three separate windings whose energization is controlled by a conventional inverter circuit having power transistors that switch on and off in response to outputs from the logic circuit 20. The invention has utility, however, for use as a motor speed and current limit control with any motor which can be made responsive to a pulse width modulated signal. It is the intent, therefore, that the invention include all modifications and alterations from the disclosed preferred embodiment falling within the spirit or scope of the appended claims.

I claim:

1. A motor control for controlling energization of a multiple phase alternating current motor having multiple motor windings comprising:

(a) a programmable controller for providing a shaped, time varying digital energization signal for each phase wherein the state of the time varying digital energization signal corresponds to an energization state of a motor winding corresponding to that phase;

(b) a current control circuit for monitoring motor current supplied to said motor, comparing said motor current with a threshold, and generating a modulation output to reduce the frequency and voltage of energization signals coupled to said motor when the motor current exceeds the threshold; and (c) logic circuitry coupled to the programmable controller and the current control circuit for receiving both the time varying digital energization signals from the programmable controller and the modulation output of said current control circuit and for producing a resultant motor control output for controlling energization of the motor windings, said resultant motor control output reducing motor energization voltage across the motor windings to zero and preventing change in motor energization signals for a duration corresponding to the degree to which the motor current exceeds the threshold.

2. The motor control of claim 1 wherein the current control circuit comprises a sensor for monitoring the current in a D.C. bus coupled to said motor through an inverter, means for converting current in the sensor to an analog output signal, and a comparator for comparing the analog output signal with a reference signal corresponding to the threshold, said comparator having an output coupled to the logic circuitry to modulate the motor frequency and voltage applied to said motor for a duration corresponding to a time period the analog output exceeds said reference signal.

3. The motor control of claim 2 wherein the means for converting comprises motor current estimating means for estimating motor current when said analog output signal exceeds said reference signal and the current in the bus fails to zero.

4. Apparatus of claim 1 wherein the motor is a three phase motor having three motor windings, the programmable controller generates three, phase shifted, time varying digital signals to approximate sinusoidal motor winding energization wherein at each moment of motor control one of said three time varying signals is of a first state and two others of said time varying signals are of a second state and further wherein the logic circuitry changes the one time vary signal having the first state to said second state upon receipt of a modulation output from said current control circuit.

5. The motor control of claim 1 wherein the time varying digital signal from the programmable controller is generated in response to a clock signal source external to the programmable controller and wherein the logic circuitry includes a gate to stop clocking of the programmable controller when the motor current exceeds the threshold to prevent the change in the state of the digital energization signals.

6. A motor control for energizing a multiple phase motor comprising:

(a) an inverter for coupling a direct current signal from a D.C. bus across multiple phase windings of said multiple phase motor, said inverter including a number of inverter switches to control an energization state of said multiple phase windings;

(b) a control unit for creating as many digital signal outputs as there are phase windings of said motor, said control unit including a programmable controller to produce a shaped time varying digital signal at each digital signal output wherein the state of the digital signal corresponds to an energization state of a corresponding motor winding; said control unit also including means for generating an adjustable repetitive digital signal to modulate the motor frequency and voltage applied to the motor windings by the inverter;

(c) logic circuitry coupled to both the time varying digital signals and the repetitive digital signal to produce resultant motor winding control outputs for controlling the opening and closing of said inverter switches; and (d) a current control circuit for monitoring motor current through said D.C. Bus, comparing said current with a threshold current, and generating an output coupled to said logic circuitry to duplicate the modulation effects of one state of said repetitive digital signal to reduce the motor speed and voltage of the energization signals coupled through said inverter, causing said D.C. bus current to be limited to approximately the threshold current.

7. The motor control of claim 6 wherein the current control circuit comprises a current sensor for monitoring the current in a direct current bus coupled to said multiple motor windings through said inverter, a differential amplifier to convert current in the shunt resistor to an analog output signal, and a comparator for comparing the analog signal with a reference signal corresponding to the threshold current, said comparator having an output coupled to the logic circuitry to modulate the motor speed and voltage applied to said windings if the analog output from said differential amplifier exceeds said reference signal.

8. The motor control of claim 7 including a nonlinear filter to shape the D.C. bus current signal from the current sensor so that the current signal is more representative of motor current during intervals when D.C. Bus current in zero.

9. Apparatus of claim 6 wherein the motor is a three phase motor having three motor windings, the control unit generates three, phase shifted, time varying signals to approximate sinusoidal motor winding energization wherein at each moment of motor control one of said three time varying signals is of a first state and two others of said time varying signals are of a second state and further wherein the logic circuitry changes the one time varying signal to said second state upon receipt of a modulation signal from either said control unit or said current control circuit.

10. A method of operating a multiphase motor comprising the steps of:

(a) programming a microprocessor controller to generate multiple controller outputs, one controller output for each phase of said multiphase motor and coordinating the relative timing of the phases of said controller outputs with respect to each other;

(b) generating a controller duty cycle frequency and voltage control signal wherein the duty cycle of said frequency and voltage control signal is adjusted to adjust the speed of the induction motor;

(c) evaluating the state of said multiple microprocessor outputs and said frequency and voltage control signal and altering said controller outputs to make the controller outputs the same state upon the occurrence of a frequency and voltage control signal of a particular state;

(d) controlling motor winding energization provided by a bus through an inverter circuit to energize motor windings of the multiphase motor in synchronization with the controller outputs as altered by the frequency and voltage control signal; and (e) monitoring the current supplied to the multiphase induction motor through the bus and overriding the evaluating step to change the outputs to the same state if an overcurrent condition is sensed, said overriding step resulting in a reduction in current in the multi-phase motor until the current falls below a threshold.

11. The method of claim 10 wherein the step of generating multiple controller outputs is temporarily halted when the frequency and voltage control signal is of the particular state.

12. The method of claim 11 wherein the energization of the motor windings is accomplished by coupling the windings through an inverter circuit to a bus and wherein the monitoring of current is performed by monitoring current passing through the bus to the inverter circuit.

13. A motor control for controlling energization of multiple motor windings of a multiple phase alternating current motor comprising:

(a) programmable controller means for providing a shaped, time varying digital energization signal for each phase wherein the state of the time varying digital energization signal corresponds to an energization state of a motor winding, said programmable controller means including an external clock input for providing clock pulses used by the programmable controller means in generating the time varying digital energization signals;

(b) current sensing means for monitoring motor current supplied to said motor, comparing said motor current with a threshold current, and generating a modulation output signal to reduce the frequency and voltage of energization signals coupled to said motor when an instantaneous sensed motor current exceeds the threshold current; and (c) logic means coupled to the programmable controller means for receipt of the time varying digital energization signals from the programmable controller means and coupled to the modulation output of said current sensing means for receipt of the modulation output signal; said logic means including means for reducing motor energization voltage across the motor windings to zero by adjusting the state of the time varying digital energization signal for at least one phase of the motor and by temporarily disabling transmission of clock signals to the programmable controller means to prevent changes in a state of the digital energization signals output by the programmable controller means.

14. The motor control of claim 13 wherein the programmable controller means includes means for generating a pulsed waveform whose duty cycle is adjusted to change the speed of the motor and wherein the logic means includes means for combining the modulation output signal of the current sensing means and the pulsed waveform from the programmable controller means to adjust motor operation in response to either a sensed current condition or from the duty cycle set by the programmable controller.

* * * * *